(12) United States Patent
Lye et al.

(10) Patent No.: US 6,309,035 B1
(45) Date of Patent: Oct. 30, 2001

(54) COMBINATION CUTTING BOARD AND COUNTERTOP SYSTEM

(75) Inventors: Michael T. Lye, Warwick; Jeremy C. Howard, Little Compton, both of RI (US); John P. Flannery, Smiths (BM); Sage N. Baker, San Diego, CA (US); Luke N. Michas, North Providence, RI (US); Christopher Raia, Brookline; Gaynor Field, Mattapoisett, both of MA (US); George G. Brin, Jr., Providence, RI (US); Marc S. Harrison, deceased, late of Portmouth, RI (US), executor, Diana Harrison; Jane K. Langmuir, Providence, RI (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/440,127

(22) Filed: Nov. 15, 1999

(51) Int. Cl.[7] ................................................ A47B 96/18
(52) U.S. Cl. ............................................ 312/140.4; 4/656
(58) Field of Search ........................... 312/140.1, 140.2, 312/140.3, 140.4; 4/631, 654, 656; 269/289 R, 320.1

(56) References Cited

U.S. PATENT DOCUMENTS

| D. 47,322 | 5/1915 | Campbell . |
| D. 206,758 | 1/1967 | Radtke . |
| D. 230,553 | 3/1974 | Terlizzi . |
| D. 244,169 | 5/1977 | Barnsley . |
| D. 337,186 | 7/1993 | Drach . |
| 630,746 | * 8/1899 | Sargent, Jr. ................... 269/302.1 |
| 655,855 | * 8/1900 | Cushman ...................... 269/302.1 |
| 768,341 | 8/1904 | Patten . |
| 2,127,826 | * 6/1938 | Meyer .......................... 312/140.3 X |
| 4,087,144 | * 5/1978 | Wax .............................. 312/140.2 X |
| 4,243,184 | * 1/1981 | Wright ........................... 269/289 R |
| 4,372,448 | * 2/1983 | Drach ............................... 211/41.3 |
| 4,480,343 | 11/1984 | Drach . |
| 4,840,361 | * 6/1989 | Richter ............................ 269/289 R |
| 5,452,666 | * 9/1995 | Peters ........................... 312/140.4 X |
| 5,722,746 | * 3/1998 | Hull et al. ...................... 312/140.3 |
| 6,026,972 | * 2/2000 | Makowski . |
| 6,182,305 | * 2/2001 | O'Connell et al. ..................... 4/631 |

FOREIGN PATENT DOCUMENTS 406105724   4/1994   (JP) .

* cited by examiner

*Primary Examiner*—Jose V. Chen
*Assistant Examiner*—Hanh V. Tran
(74) *Attorney, Agent, or Firm*—Everett G. Diederiks, Jr. Esq.

(57) ABSTRACT

A cutting board and countertop are correspondingly constructed to enable the cutting board to be supported upon the countertop in multiple, varying height positions. The countertop preferably includes a main, substantially planar work surface provided with a frontal, upstanding lip, as well as at least one ledge provided at a position spaced across the work surface from the lip. The cutting board is generally constituted by substantially planar member having support elements provided on opposing, terminal side portions. In a first height position, the cutting board is arranged against both the lip and the ledge. In the second height position, the cutting board is inverted and positioned against the frontal lip and upon the ledge. In either position, the cutting board can readily slide along the countertop.

20 Claims, 2 Drawing Sheets

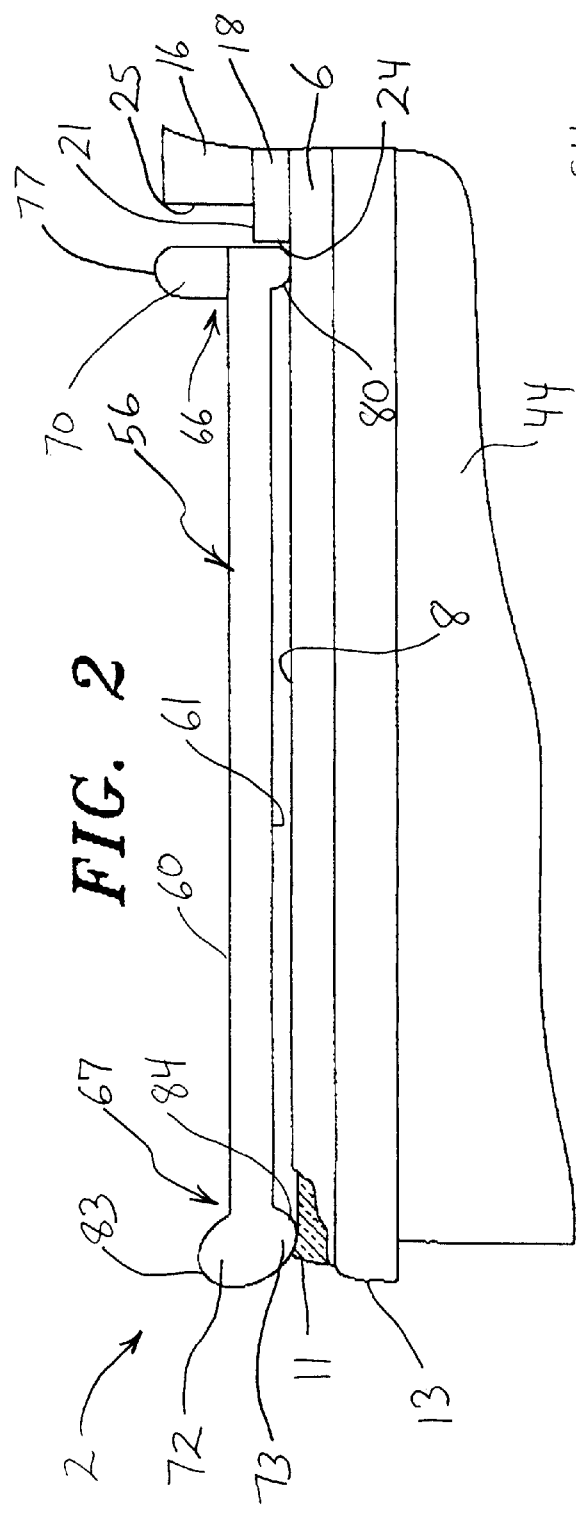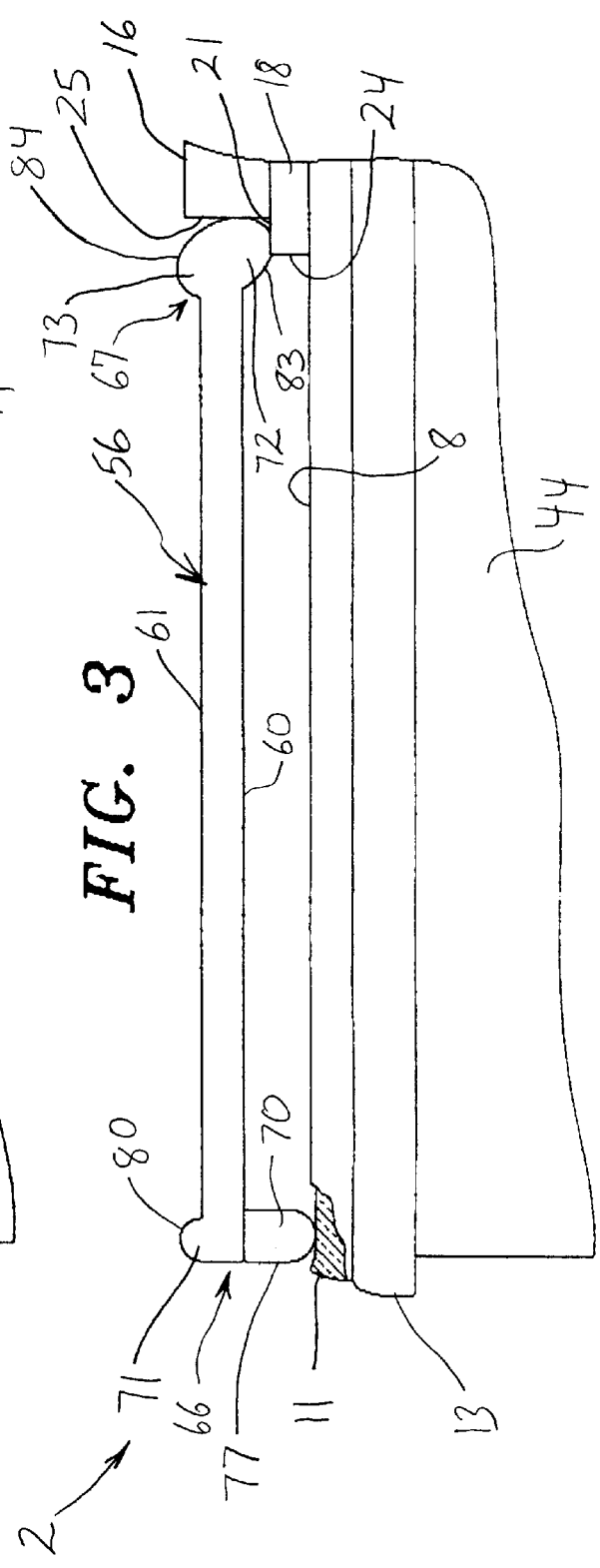

US 6,309,035 B1

COMBINATION CUTTING BOARD AND COUNTERTOP SYSTEM

BACKGROUND OF THE INVENTION

1. Field of the Invention

The present invention is in the kitchen or cooking environment and, more specifically, to a versatile cutting board and countertop arrangement for use in such an environment.

2. Discussion of the Prior Art

In the art of food preparation, it is common to perform slicing, dicing and other cutting operations on food products. Typically, these operations are performed on a cutting board placed upon a countertop surface. A cutting board is generally utilized to avoid marring or otherwise altering the finish and aesthetic appearance of the countertop.

Cutting boards available on the marketplace today are known to be made from various materials, including wood, plastic, marble and the like. Regardless of the particular material utilized, a cutting board almost invariably takes the form of a plate-like member having opposing, substantially planar opposing surfaces. With this construction, either of the planar surfaces can be readily utilized for a desired food preparation purpose. Because of this common cutting board construction, the height at which the cutting surface defined by the board is arranged above the countertop is identical regardless of which side of the cutting board is exposed.

In some instances, it would be beneficial to readily vary the height of the cutting board relative to the upper surface of the countertop. This height varying function can be significant for a number of reasons. For instance, the height of the particular individual preparing the food can dictate an optimal height for the cutting board. That is, a preferred height to perform a food preparation operation can vary from a person in a wheelchair to a rather tall individual. Furthermore, there are increasing concerns regarding repetitive motions causing carpal tunnel and other syndromes. Providing a variable height cutting board may have some beneficial effect as performing cutting operations at varying heights will inherently alter the particular body parts directly affected during the cutting operations.

Another problem associated with standard cutting boards concerns the ability of the board to slide or otherwise shift around during use. Typically, a cutting board is simply placed upon a portion of a countertop without any restraints other than surface friction between the countertop and the cutting board. This type of arrangement will not effectively limit relative shifting between the cutting board and the countertop during a food prep operation. Although certain proposals have been made in the art to form a countertop with recessed areas for receiving a cutting board and guiding the cutting board for relative sliding movement, such known arrangements are considered to be designed to the aesthetic and functional detriment of the countertop considered alone.

Based on the above, there exists a need in the art for a combination cutting board and countertop assembly which will permit a cutting board to be readily adjusted for use at varying heights, while guidably supporting the cutting board in a manner which does not deter from the structure of the countertop when considered alone.

SUMMARY OF THE INVENTION

The present invention pertains to a combination cutting board and countertop system including a countertop having multiple, vertically offset support surfaces and a cutting board that can be supported at selected ones of the support surfaces in order to enable the cutting board to be repositioned at differing heights above the countertop. More specifically, the cutting board is generally defined by a planar member having first and second, opposing work surfaces from which extend various support elements. In the most preferred embodiment of the invention, the support elements are located at respective transverse edges of the cutting board. When in a first support position wherein the first working surface of the cutting board is exposed, the cutting board is supported upon each of the first and second vertically offset support surfaces of the countertop. In a second support position, the second working surface of the cutting board is exposed for use and the cutting board is entirely supported upon only one of the offset surface portions of the countertop. In either of these variable height positions, the respective working surface of the cutting board extends in a substantially horizontal plane.

In the most preferred embodiment of the invention, the countertop also includes a peripheral, upstanding rim portion which aids in locating the cutting board on the countertop, while also guidably supporting the cutting board for sliding movement along the countertop. With this overall arrangement, the cutting board can be advantageously positioned at various locations along the countertop, while also accommodating some vertical adjustability of the cutting board relative to the countertop. Therefore, a cutting board and countertop structured in accordance with the present invention combine to define a versatile, readily adjustable, synergistic arrangement.

Additional objects, features and advantages of the present invention will become more readily apparent from the following detailed description of a preferred embodiment thereof when taken in conjunction with the drawings wherein like reference numerals refer to the corresponding parts in the several views.

BRIEF DESCRIPTION OF THE DRAWINGS

FIG. 2 is a partial sectional side view of the countertop and the cutting board system of FIG. 1, with the cutting board being shown supported in a second, lower height position; and FIG. 3 is a sectional side view similar to that of FIG. 2 which again shows the cutting board in the first height position.

DETAILED DESCRIPTION OF THE PREFERRED EMBODIMENT

Figure 1:
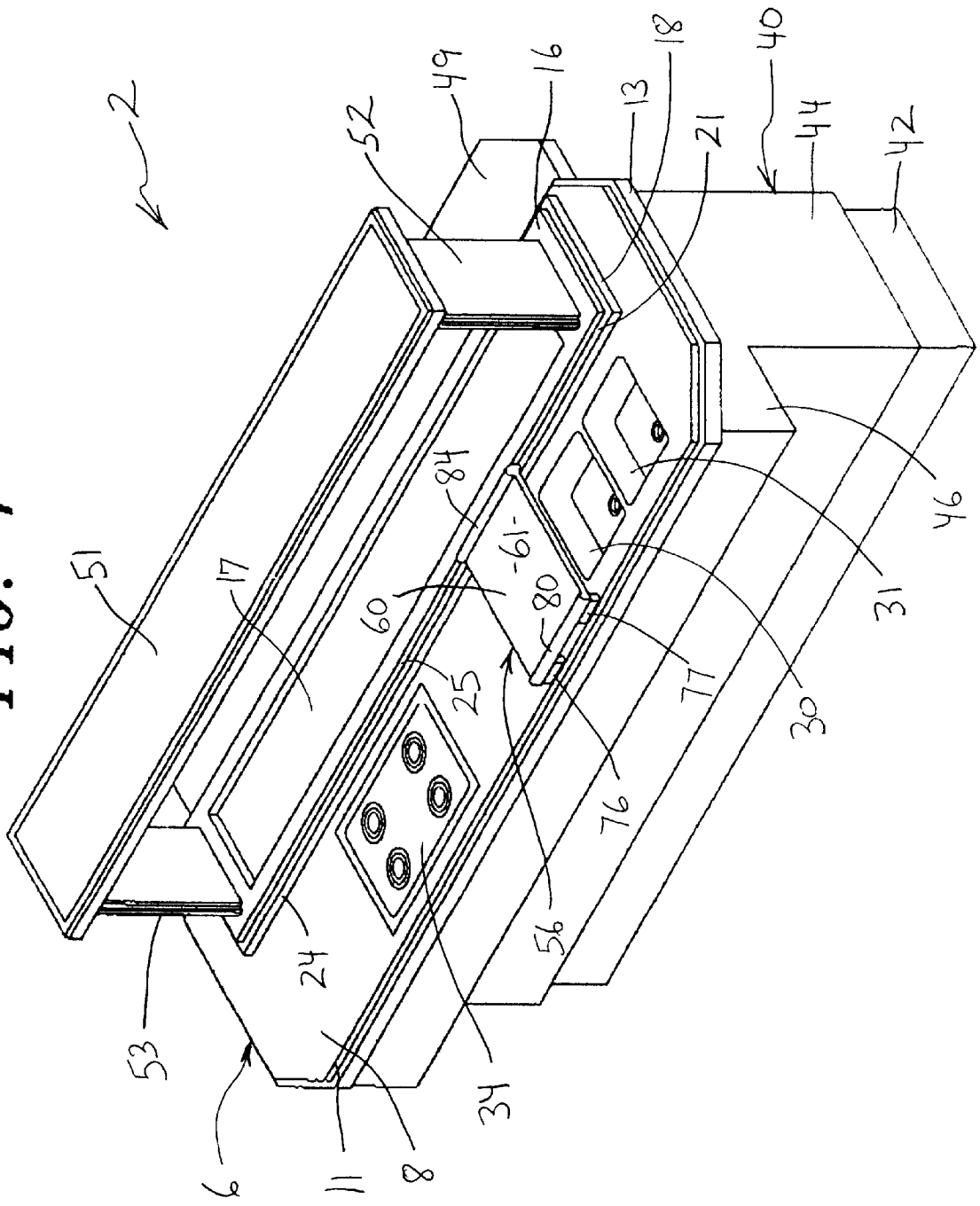
FIG. 1 is an upper perspective view of th e cutting board and countertop system of the present invention with the cutting board being shown at a first height position.

With reference to FIGS. 1–3, the cutting board and countertop system of the invention is generally indicated at 2. System 2 includes an overall countertop 6 including a first work surface 8 provided with an upwardly curved, peripheral lip 11. Also located around first work surface 8, at a position slightly outwardly and below lip 11, is preferably provided railing trim 13. The overall countertop 6 also includes a raised platform 16 including a central zone 17 which is shown to be recessed. Furthermore, countertop 6 includes an intermediate tier 18 arranged between first work surface 8 and raised platform 16. Intermediate tier 18 defines a ledge surface portion 21 which is defined between a vertical wall 24 of intermediate tier 18 and a vertical wall 25 of platform 16.

At this point, it should be readily apparent that countertop 6 is shown associated with a kitchen island and for this reason countertop 6 is shown to be provided with a pair of spaced sinks 30 and 31, as well as an electric cooktop 34. Although countertop 6 is disclosed in connection with a kitchen island, it should be realized that the invention has applicability outside this particular environment. More specifically, the cutting board and countertop system 2 can be used in various types of workstations. In addition, even in the kitchen environment, the invention also has applicability to countertop arrangements mounted against a wall, wherein ledge 21 would be formed in a backsplash portion of the countertop. In any event, regardless of the particular environment of use, system 2 preferably incorporates the countertop 6 having the first work surface 8 with the annular lip 11 and the ledge portion 21. The particular importance of these structural features will become more readily apparent below in further detailing the invention.

For the sake of completeness, countertop 6 is shown to be supported by a base 40 having a lowermost section 42 and an upper section 44 that includes an outwardly extending portion 46. Therefore, upper section 44, with outwardly extending portion 46, supports countertop 6 such that first work surface 8 extends in a substantially horizontal plane. Furthermore, in the preferred embodiment shown, upper section 44 further supports a cantilevered table 49. With this arrangement, table 49 can be used in connection with chairs or the like as a small breakfast or other eating area while the portion of countertop 6 located on the opposite side of platform 16 from table 49 would generally be located in a kitchen area. Again, this arrangement is merely presented in accordance with the preferred embodiment of the invention. For the sake of completeness, system 2 is also shown to include an upper tabletop 51 that is supported above raised platform 16 by means of spaced pillars 52 and 53.

System 2 also includes a cutting board generally indicated at 56. As shown in these figures, cutting board 56 includes a first side 60 and a second side 61, both of which define potential, planar work surfaces for a user of cutting board 56. Cutting board 56 has a first end portion 66 and a second end portion 67. In accordance with the invention, cutting board 56 is adapted to be usable at varying height positions above work surface 8 due to the presence of various support elements 70–73. More specifically, support elements 70 are preferably defined by a pair of spaced feet 76 and 77 which project from first side 60 of cutting board 56 at first end portion 66. Opposing feet 76 and 77 and projecting from second side 61 of cutting board 56 at first end portion 66 is a transverse, preferably rounded projection 80. As clearly shown in FIG. 1, projection 80 preferably extends entirely across first end portion 66. Support elements 72 and 73 are located at second end portion 67 of cutting board 56. More specifically, support element 72 extends from first side 60 of cutting board 56 and is defined by an elongated transverse node 83. Finally, support element 73 is defined by a nodule 84 that projects from second side 61 of cutting board 56 at second end portion 67.

With this arrangement, cutting board 56 can be supported such that the work surfaces on first and second sides 60 and 61 are arranged above work surface 8 of countertop 6 in one of two varying height positions. FIG. 2 illustrates cutting board 56 in a lowered support position wherein nodule 84 is generally arranged against a portion of annular lip 11 and transverse projection 80 extends along vertical wall 24 of intermediate tier 18. In this position, cutting board 56 is permitted to shift longitudinally along countertop 6, i.e., generally to the right of that shown in FIG. 1 to beyond sinks 30 and 31 and also to the left beyond electric cooktop 34. Shifting in a direction generally perpendicular to this sliding movement is controlled due to the arrangement of nodule 84 against lip 11 and transverse projection 80 against vertical wall 24.

On the other hand, cutting board 56 can be inverted such that second side 61 is exposed as generally shown in FIGS. 1 and 3. In this configuration, feet 76 and 77 are generally arranged at annular lip 11 and node 83 is supported upon ledge portion 21, while also generally abutting vertical wall 25. In this position, cutting board 56 can also slide along countertop 6, while being restricted from shifting in a direction generally perpendicular to this sliding movement. Therefore, with this construction of cutting board 6 and countertop 56, an extremely practical and versatile cutting board arrangement is defined. That is, cutting board 56 can be readily repositioned for use at varying heights and essentially at any position across countertop 6.

In accordance with the invention, cutting board 56, as well as countertop 6, can be formed of various materials. For instance, cutting board 56 can be formed of wood, plastic, ceramic, marble and like materials. There is a wide range of materials generally utilized in connection with countertops in the art and all of these known materials are usable in accordance with the present invention. Cutting board 56 can be formed integral with support elements 70–73, or separate support elements 70–73 could be attached at first and second end portions 66 and 67. In any event, it is only important to note that countertop 6 and cutting board 56 combine to produce synergistic results in enabling cutting board 56 to be readily utilized and sufficiently supported in multiple, varying height positions. However, although described with respect to a preferred embodiment of the invention, it should be understood that various changes and/or modifications can be made from the invention without departing from the spirit thereof. In general, the invention is only intended to be limited by the scope of the following claims.

We claim:

1. A combination cutting board and countertop system comprising:
    a kitchen countertop including first and second vertically offset surface portions; and
    a cutting board having opposing first and second sides, with each of the first and second sides defining a respective work surface, said cutting board being selectively supportable at one of first and second heights relative to the countertop wherein, in a first height position, the cutting board is supported solely by the first surface portion of the countertop with the first side of the cutting board being exposed and, in a second height position, the cutting board is supported by both the first and second surface portions of the countertop with the second side of the cutting board being exposed.

2. The combination cutting board and countertop system according to claim 1, wherein the cutting board includes spaced transverse edge portions, said cutting board further including multiple support elements projecting from the first and second sides at the edge portions.

3. The combination cutting board and countertop system according to claim 2, wherein a respective one of the support elements projects from the cutting board at each of the terminal edge portions on both the first and second sides.

4. The combination cutting board and countertop system according to claim 3, wherein the support elements provided on the first side of the cutting board project further than the support elements provided on the second side of the cutting board.

5. The combination cutting board and countertop system according to claim 4, wherein the support element provided at one of the edge portions on the first side of the cutting board projects further from the first side than the support element projecting from the first side of the cutting board at the opposing edge portion.

6. The combination cutting board and countertop system according the claim 1, wherein the first surface portion of the countertop is defined by an upper work surface and the second portion is defined by a rear ledge arranged above the upper work surface of the countertop.

7. The combination cutting board and countertop system according to claim 6, wherein the cutting board is supported against a surface of the rear ledge when in the first height position and upon the rear ledge when in the second height position.

8. The combination cutting board and countertop system according to claim 7, wherein the countertop further includes an additional ledge extending above the rear ledge, said cutting board being positioned against the additional ledge when in the second height position.

9. The combination cutting board and countertop system according to claim 6, wherein the countertop includes a frontal, upstanding lip, said cutting board being positioned directly adjacent the frontal lip when in each of the first and second height positions.

10. The combination cutting board and countertop system according to claim 1, wherein each of the first and second sides of the cutting board is spaced above the first surface portion of the countertop in each of the height positions.

11. A combination cutting board and countertop system comprising:

a kitchen countertop including first and second vertically offset surface portions; and a cutting board having opposing first and second sides, said cutting board and countertop including means for supporting the cutting board at first and second varying height positions relative to the first surface portion of the countertop with the cutting board being supported solely upon the first surface portion in the first height position and by both the first and second surface portions of the countertop in the second height position.

12. The combination cutting board and countertop system according to claim 11, wherein each of the first and second sides of the cutting board extend in a respective, substantially horizontal plane in each of the first and second height positions.

13. A combination cutting board and countertop system comprising:

a countertop including first and second vertically offset surface portions; and a cutting board having opposing first and second sides, said cutting board and countertop including means for supporting the cutting board at first and second varying height positions relative to the first surface portion of the countertop with the cutting board being supported solely upon the first surface portion in the first height position and by both the first and second surface portions of the countertop in the second height position, wherein each of the first and second sides of the cutting board is spaced above the first surface portion of the countertop in each of the first and second height positions.

14. The combination cutting board and countertop system according the claim 11, wherein the first surface portion of the countertop is defined by an upper work surface and the second portion is defined by a rear ledge arranged above the upper work surface.

15. The combination cutting board and countertop system according to claim 14, wherein the cutting board is supported against the rear ledge when in the first height position and upon the rear ledge when in the second height position.

16. The combination cutting board and countertop system according to claim 15, wherein the countertop firther includes an additional ledge extending above the rear ledge, said cutting board being positioned against the additional ledge when in the second height position.

17. The combination cutting board and countertop system according to claim 14, wherein the countertop includes a frontal, upstanding lip, said cutting board being positioned directly adjacent the frontal lip when in each of the first and second height positions.

18. The combination cutting board and countertop system according to claim 11, wherein the cutting board includes spaced transverse edge portions, said cutting board further including multiple support elements projecting from the first and second sides at the edge portions.

19. The combination cutting board and countertop system according to claim 18, wherein a respective one of the support elements projects from the cutting board at each of the edge portions on both the first and second sides.

20. The combination cutting board and countertop system according to claim 19, wherein the support elements provided on the first side of the cutting board project further than the support elements provided on the second side of the cutting board.

* * * * *